(12) United States Patent
Boden et al.

(10) Patent No.: US 11,196,320 B2
(45) Date of Patent: Dec. 7, 2021

(54) ELECTRIC MACHINE ROTOR (71) Applicants: Rolls-Royce plc, London (GB); Rolls-Royce Corporation, Indianapolis, IN (US)

(72) Inventors: Mark Boden, Derbyshire (GB); Donald Klemen, Carmel, IN (US); Jonathan Terrell, Zionsville, IN (US); Brian Maners, Cloverdale, IN (US)

(73) Assignees: Rolls-Royce Corporation, Indianapolis, IN (US); Rolls-Royce PLC, London (GB)

( * ) Notice: Subject to any disclaimer, the term of this patent is extended or adjusted under 35 U.S.C. 154(b) by 97 days.

(21) Appl. No.: 16/690,510

(22) Filed: Nov. 21, 2019

(65) Prior Publication Data
US 2021/0159755 A1 May 27, 2021

(51) Int. Cl.
*H02K 5/15* (2006.01)
*H02K 7/00* (2006.01)
*H02K 5/22* (2006.01)
*H02K 1/27* (2006.01)

(52) U.S. Cl.
CPC ............ *H02K 5/15* (2013.01); *H02K 1/2706* (2013.01); *H02K 5/225* (2013.01); *H02K 7/003* (2013.01)

(58) Field of Classification Search
CPC ............ H02K 5/15; H02K 5/16; H02K 5/225; H02K 1/2706; H02K 7/003
USPC ........................................................... 310/89
See application file for complete search history.

(56) References Cited

U.S. PATENT DOCUMENTS

| 3,735,174 | A | | 5/1973 | Bosch et al. | |
| 5,899,411 | A | * | 5/1999 | Latos | H02J 7/1423 244/53 A |
| 9,714,609 | B2 | | 7/2017 | French et al. | |
| 2006/0022541 | A1 | * | 2/2006 | Ong | H02K 1/28 310/156.53 |
| 2017/0001513 | A1 | * | 1/2017 | Kuroda | F16H 1/32 |
| 2018/0358867 | A1 | | 12/2018 | Paul et al. | |

FOREIGN PATENT DOCUMENTS

EP WO2015185350 * 12/2015 ............. H02K 7/003

* cited by examiner

*Primary Examiner* — Terrance L Kenerly
(74) *Attorney, Agent, or Firm* — Shumaker & Sieffert, P.A.

(57) ABSTRACT

A rotor of an electric machine includes a main rotor body having a longitudinal axis, the main rotor body comprising: a hollow cylinder body with a first end and a second end; an integral end flange at the first end; a separate end flange disposed at the second end of the cylinder body; and laminations disposed on an outer surface of the cylinder body, the laminations comprising magnetic material.

20 Claims, 6 Drawing Sheets

ELECTRIC MACHINE ROTOR

TECHNICAL FIELD

This disclosure relates to rotors of electric machines.

BACKGROUND

Electric machines covert between electrical energy and mechanical energy. As one example, an electric machine may operate as a generator that converts mechanical energy into electrical energy. As another example, an electric machine may operate as an electrical motor that converts electrical energy into mechanical energy. Electric machines typically include a rotor that rotates within a stator. Energy flows through the stator to or from the rotor. In an electric motor, the stator provides a rotating magnetic field that drives the rotor. In a generator, the stator converts the rotating magnetic field to electric energy.

SUMMARY

In one example, a rotor of an electric machine includes a main rotor body having a longitudinal axis, the main rotor body comprising: a hollow cylinder body with a first end and a second end; an integral end flange at the first end; a separate end flange disposed at the second end of the cylinder body; and laminations disposed on an outer surface of the cylinder body, the laminations comprising magnetic material.

The details of one or more examples are set forth in the accompanying drawings and the description below. Other features, objects, and advantages will be apparent from the description and drawings, and from the claims.

DETAILED DESCRIPTION

Electrical machines may be used to provide energy to, or extract energy from, rotating devices. As one example, an electrical generator may convert rotational mechanical energy extracted from a combustion motor into electrical energy. As another example, an electrical motor may provide rotational mechanical energy to assist with starting a combustion motor. As another example, an electrical motor may provide rotational mechanical energy to drive a propulsor (e.g., fan, propeller, etc.) of a vehicle. An electric machine may operate in various modes at different times. For instance, a particular electrical machine may operate as a starter to start a combustion motor at a first time and operate as a generator to convert rotational mechanical energy generated by the combustion motor into electrical energy at a second time. In this way, an electric machine may operate as an electrical starter-generator.

An electric machine may include a rotor that rotates within a stator. The rotor may include magnets disposed around a cylindrical body of the rotor that interact with windings included in the stator to transfer energy. The diameter of the cylindrical body may be related to the amount of energy than may be transferred. As such, in some cases, it may be desirable for the cylindrical body to have a relatively large diameter (e.g., relative to a shaft connected to the rotor). However, increasing the diameter of the cylindrical body may increase the mass of the rotor, which may undesirably increase the moment of inertia.

In accordance with one or more techniques of this disclosure, a rotor may include a hollow cylindrical body with an end flange on either side to reduce the diameter (e.g., to facilitate connection with a shaft). By using a hollow cylindrical body, the diameter of the cylindrical body may be increased without substantially increasing the moment of inertia.

Additionally, in some examples, it may be desirable to reduce the part count of a rotor. For instance, reducing the part count (e.g., the quantity of components included on a bill of materials (BOM)) for the rotor may reduce the cost, manufacturing time, and/or manufacturing difficulty of the rotor.

In accordance with one or more techniques of this disclosure, an end flange and a cylindrical body may be merged into a single component. For instance, a rotor may include a main rotor body including a hollow cylinder body with a first end and a second end, and an integral end flange at the first end of the main rotor body. A separate end flange (e.g., not included in the single component) may be disposed at the second end of the cylinder body. Merging an end flange and the cylindrical body into a single component may provide various advantages. As one example, reducing the part count by at least one may provide the benefits listed above. As another example, connective hardware between the cylindrical body and end flange that is now integrated may be omitted, thus reducing part count and/or reducing mass.

Figure 1:
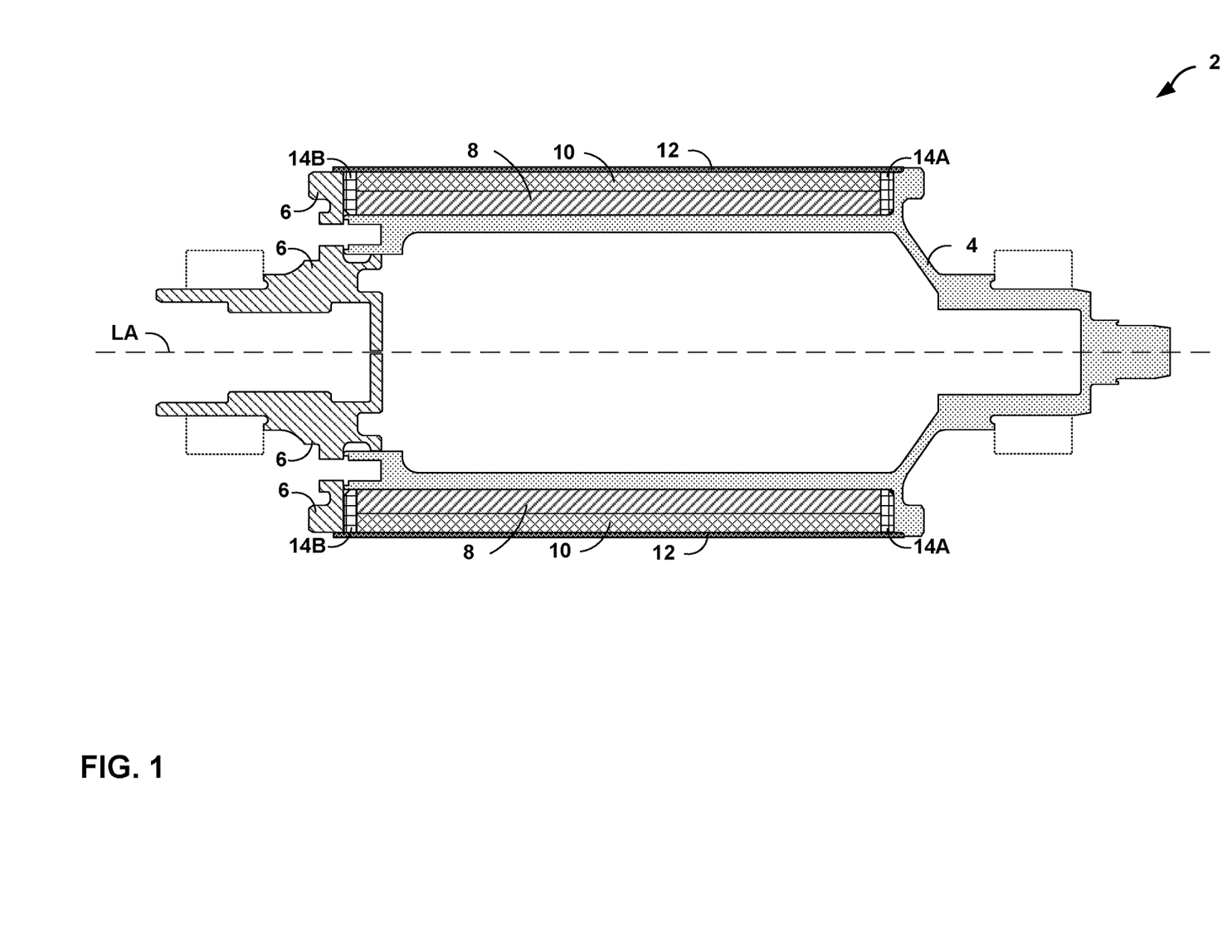
FIG. 1 is a cross section diagram of an assembled rotor configured according to various aspects of the techniques described in this disclosure.

FIG. 1 is a cross section diagram of an assembled rotor configured according to various aspects of the techniques described in this disclosure. As shown in FIG. 1, rotor 2 include main rotor body 4 and separate end flange 6. In operation, rotor 2 may rotate about longitudinal axis LA.

Rotor 2 may include several components disposed on an outer surface of main rotor body 4. For instance, as shown in the example of FIG. 1, rotor 2 may include laminations 8, magnetic material 10, sleeve 12, and spacers 14A and 14B (collectively, "spacers 14").

Sleeve 12 may be configured to retain other components on main rotor body 4. For instance, sleeve 12 may retain laminations 8, magnetic material 10, and/or spacers 14 on main rotor body 4. In some examples, sleeve 12 may be formed of a metallic material. As such, in some examples, sleeve 12 may be referred to as a metallic sleeve. In other examples, sleeve 12 may be formed of a non-metallic material. For instance, sleeve 12 may be formed of a composite material.

To assemble rotor 2, end flange 6 may be press-fit into main rotor body 4. In some examples, end flange 6 may be affixed to main rotor body 4 with mounting hardware. Examples of mounting hardware include, but are not limited to, bolts, screws, rivets, or the like.

Figure 2:
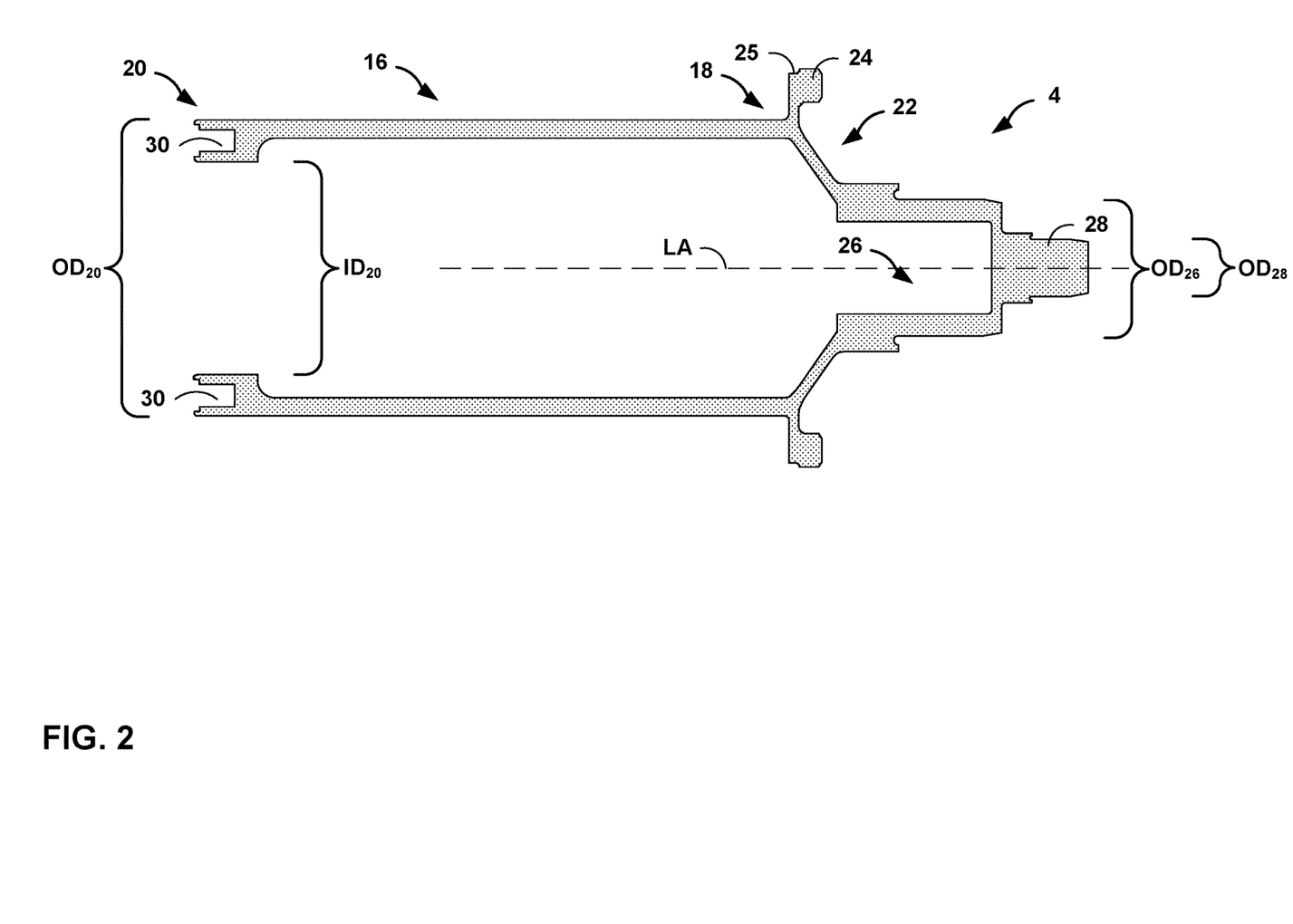
FIG. 2 is a cross section diagram of a main rotor body shown in the example of FIG. 1 that includes a cylindrical body and an integrated end flange configured according to various aspects of the techniques described in this disclosure.

FIG. 2 is a cross section diagram of a main rotor body shown in the example of FIG. 1 that includes a cylindrical body and an integrated end flange configured according to various aspects of the techniques described in this disclosure. As shown in FIG. 2, main rotor body 4 includes hollow cylinder body 16 having first end 18 and second end 20. Main rotor body 4 further includes integral end flange 22 disposed at first end 18 of cylinder body 16.

In some examples, main rotor body 4 may include retention flange 24 positioned proximal to first end 18. Retention flange 24 may retain and/or provide support for other components of rotor 2, such as laminations 8, magnetic material 10, sleeve 12, and spacers 14 (each of which is shown in more detail in the example of FIG. 1 but omitted from FIG. 2 for ease of illustration purposes). As shown in FIG. 2, retention flange 24 may include notch 25, which may be configured to receive an edge of sleeve 12.

Main rotor body 4 may include one or more shafts disposed at a distal end of end flange 22. For instance, as shown in FIG. 2, main rotor body 4 may include shaft 26 disposed at the distal end of end flange 22 and shaft 28 disposed at a distal end of shaft 26. Shaft 26 may include a shoulder (e.g., a bearing shoulder) that supports rotor 2. Shaft 28 may be configured for insertion into a rotational speed and/or position measurement device (e.g., a resolver).

As shown in the example of FIG. 2, the outer diameters of shafts 16 and 28 may be different. For instance, an outer diameter of shaft 28 (i.e., $OD_{28}$) may be less than an outer diameter of shaft 26 (i.e., $OD_{26}$). By including shaft 28 with a smaller outer diameter than shaft 26, main rotor body 4 may be supported by a larger bearing while still using a smaller resolver. Shafts 26 and 28 may both be hollow, both be solid, or be a mix of hollow and solid. For instance, as shown in FIG. 2, shaft 26 may be hollow and shaft 28 may be solid.

As discussed above, a resolver may be used to measure a speed and/or position of rotor 2. In some examples, the output of the resolver may be utilized (e.g., by a controller) to manage operation of an electric machine that includes rotor 2.

Main rotor body 4 may include features configured to facilitate attachment of other components of rotor 2 to main rotor body 4. For instance, as shown in the example of FIG. 2, main rotor body 4 may include receptacles 30, which may be threaded or otherwise configured to receive bolts to facilitate the attachment of end flange 6 to main rotor body 4.

Main rotor body 4 may be fabricated as a single piece of material. As such, no attachment hardware may be necessary to join the components of main rotor body 4.

Figure 3:
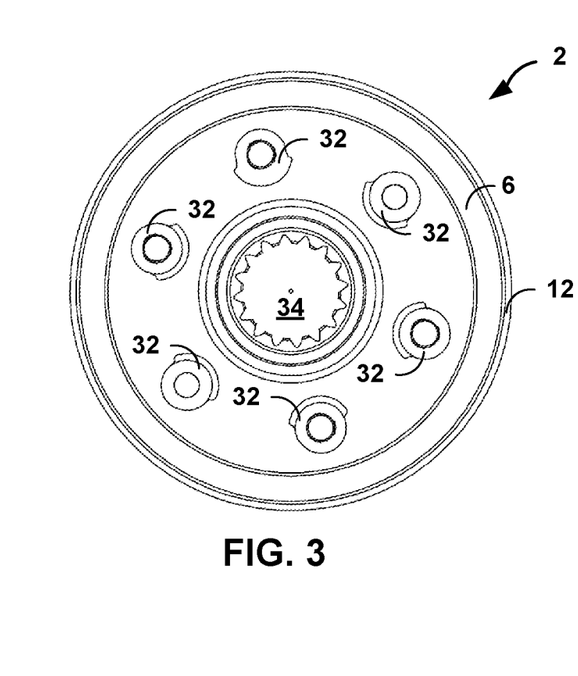
FIG. 3 is a side view of the rotor shown in the example of FIG. 1 configured according to various aspects of the techniques described in this disclosure.

FIG. 3 is a side view of the rotor shown in the example of FIG. 1 configured according to various aspects of the techniques described in this disclosure. The side view shown in the example of FIG. 3 is from a perspective looking directly at end flange 6. As discussed above, end flange 6 may be attached to main rotor body 4 with attachment hardware. As shown in FIG. 3, end flange 6 may be attached to main rotor body 4 with bolts 32, which may connect to receptacles 30 of main rotor body 4 shown in more detail with respect to the example of FIG. 2.

End flange 6 may include features configured to facilitate attachment to a shaft (e.g., that couples rotor 2 to a motor or engine). For instance, as shown in the example of FIG. 3, end flange 6 may include spline interface 34 that may facilitate attachment of a shaft (e.g., a quill shaft) to end flange 6.

As discussed above, rotor 2 may include sleeve 12. In some examples, an outer diameter of sleeve 12 may be greater than an outer diameter of end flange 6. As such and as can be seen in the example of FIG. 3, sleeve 12 may be visible over end flange 6.

Figure 4:
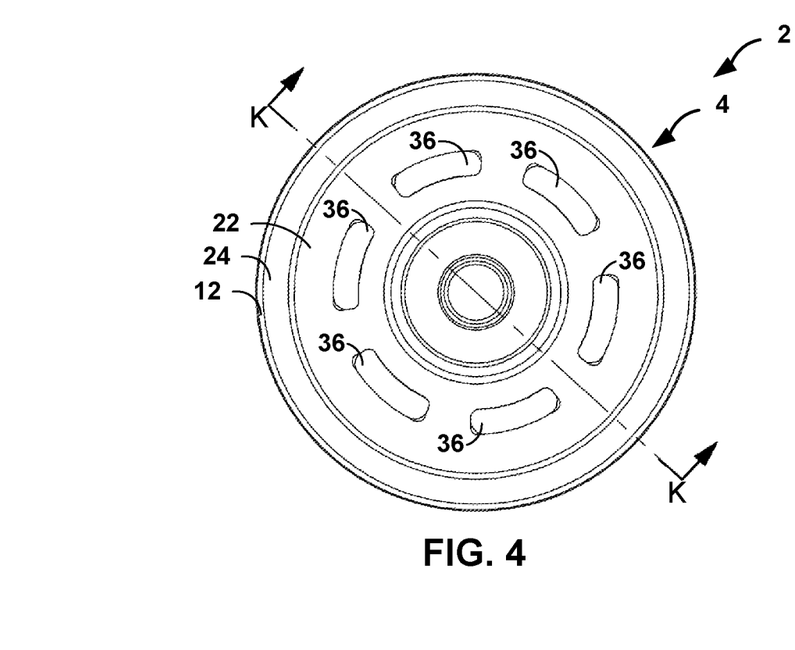
FIG. 4 is another side view of the rotor of FIG. 1 configured in accordance with various aspects of the techniques described in this disclosure.

FIG. 4 is another side view of the rotor of FIG. 1 configured in accordance with various aspects of the techniques described in this disclosure. The side view of FIG. 4 is from a perspective opposite the perspective of FIG. 3 (i.e., from the opposite end of the router in this example). Additionally, the cross-section view shown in the example of FIG. 1 may be along line K-K of FIG. 4.

In some examples, end flange 22 may include features to reduce a hoop stiffness of rotor 2. For instance, as shown in the example of FIG. 4, end flange 22 may include slots 36. Slots 36 may be radially disposed about longitudinal axis LA. By including slots 36, the hoop stiffness of rotor 2 may be reduced. In this way, lamination stresses (e.g., between main rotor body 4 and laminations 8/magnetic material 10) may be reduced.

As discussed above, rotor 2 may include sleeve 12. In some examples, an outer diameter of sleeve 12 may be greater than an outer diameter of end flange 22 and retention flange 24. As such and as can be seen in the example of FIG. 4, sleeve 12 may be visible over retention flange 24.

Figure 5:
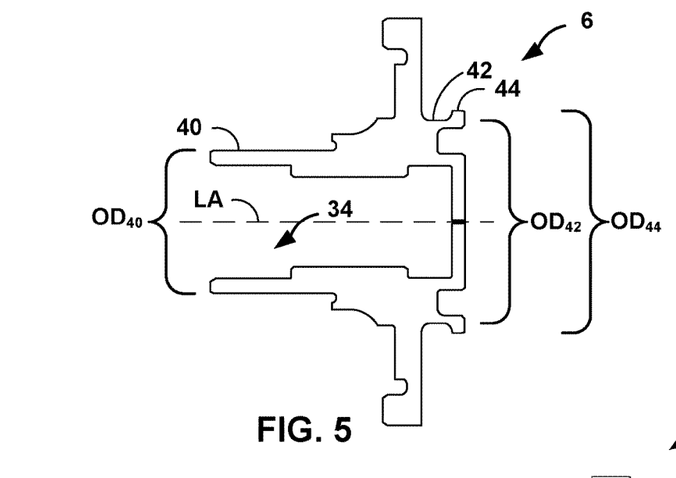
FIG. 5 is a cross-section view of end flange 6 of rotor 2 of FIG. 1 configured in accordance with various aspects of the techniques described in this disclosure.

FIG. 5 is a cross-section view of end flange 6 of rotor 2 of FIG. 1 configured in accordance with various aspects of the techniques described in this disclosure. As shown in the example of FIG. 5, end flange 6 includes shaft 40 that facilitates attachment of another shaft to end flange 6. As discussed above, end flange 6 may include spline interface 34. As shown in the example of FIG. 5, spline interface 34 may be included within shaft 40, which itself is disposed about longitudinal axis LA. In some examples, such as where shaft 40 includes spline interface 34, shaft 40 may be a hollow shaft.

As discussed above, end flange 6 may be press-fit into main rotor body 4. When press-fit into main rotor body 4, at least a portion of end flange 6 may extend longitudinally into main rotor body 4. For instance, segments 42 and 44 of end flange 6 may extend into second end 20 of cylinder body 16 of main rotor body 4. In some examples, segments 42 and 44 may have equal outer diameters (e.g., $OD_{42}$ may be equal to $OD_{44}$). Segments 42 and 44 may, for example, have different outer diameters (e.g., $OD_{42}$ may be different than $OD_{44}$).

For instance, as shown in the example of FIG. 5, the outer diameter of segment 44 may be greater than an outer diameter of segment 42. The difference between the outer diameters of segments 42 and 44 may provide various advantages. For instance, when press-fit into main rotor body 4, the outer surface of segment 44 may contact main rotor body 4 while the outer surface of segment 42 may not contact main rotor body 4. As shown in the example of FIG. 5, segment 44 may be inboard from segment 42 (i.e., segment 44 extends further into cylinder body 16 than segment 42). In some examples, this difference in outer diameter may reduce end effects that may increase stiffness in laminations 8 and/or magnetic material 10.

In some examples, at least some of the portion of end flange 6 that extends into main rotor body 4 may reside under at least a portion of magnetic material 8. For instance, as can be seen in the example of FIG. 1, at least segment 44 extends longitudinally under at least a portion of magnetic material 8. As discussed above, by extending the outer surface engagement point into main rotor body 4, the design of this disclosure may reduce end effects that may increase stiffness in laminations 8 and/or magnetic material 10.

Figure 6:
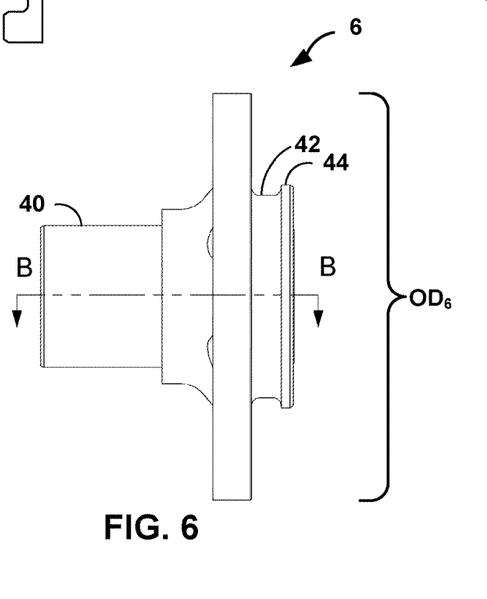
FIG. 6 is a front view of end flange 6 of rotor 2 shown in the example of FIG. 1 configured in accordance with one or more techniques of this disclosure.

FIG. 6 is a front view of end flange 6 of rotor 2 shown in the example of FIG. 1 configured in accordance with one or more techniques of this disclosure. The cross-section view shown in the example of FIG. 5 may be along line B-B shown in the example of FIG. 6.

As can be seen in the examples of FIGS. 1, 2, and 6, in some examples, an outer diameter of end flange 6 may be greater than an outer diameter of second end 20 of cylinder body 16 (e.g., $OD_6$ may be greater than $OD_{20}$). In this way, end flange 6 may be considered to include a retention flange that performs operations similar to retention flange 24. Additionally or alternatively, by having a greater outer diameter than the portion of main rotor body into which end flange 6 is press-fit, end flange 6 may further reduce lamination stresses.

Figure 7:
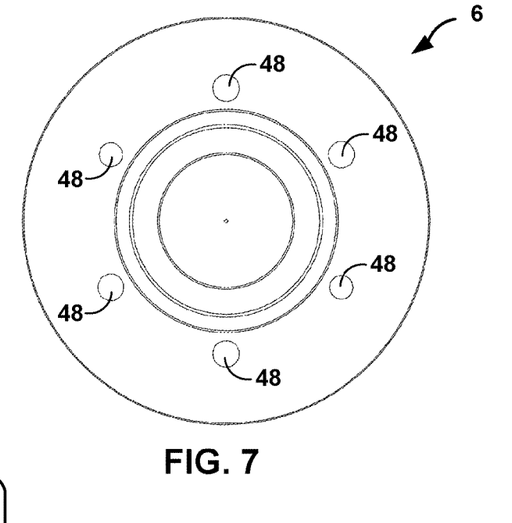
FIG. 7 is a side view of end flange 6 of rotor 2 of FIG. 1 configured in accordance with one or more aspects of this disclosure.

FIG. 7 is a side view of end flange 6 of rotor 2 of FIG. 1 configured in accordance with one or more aspects of this disclosure. The side view shown in the example of FIG. 7 may be from a perspective opposite the view shown in the example of FIG. 3. As discussed above, end flange 6 may be secured to main rotor body 4 using mounting hardware. For instance, as shown in the example of FIG. 3, end flange 6 may be attached to main rotor body 4 via bolts 32. As shown in the example of FIG. 7, end flange 6 may include holes (e.g., clearance holes) 48 configured to facilitate the attachment of end flange 6 to main rotor body 4 via bolts 32.

Figure 8:
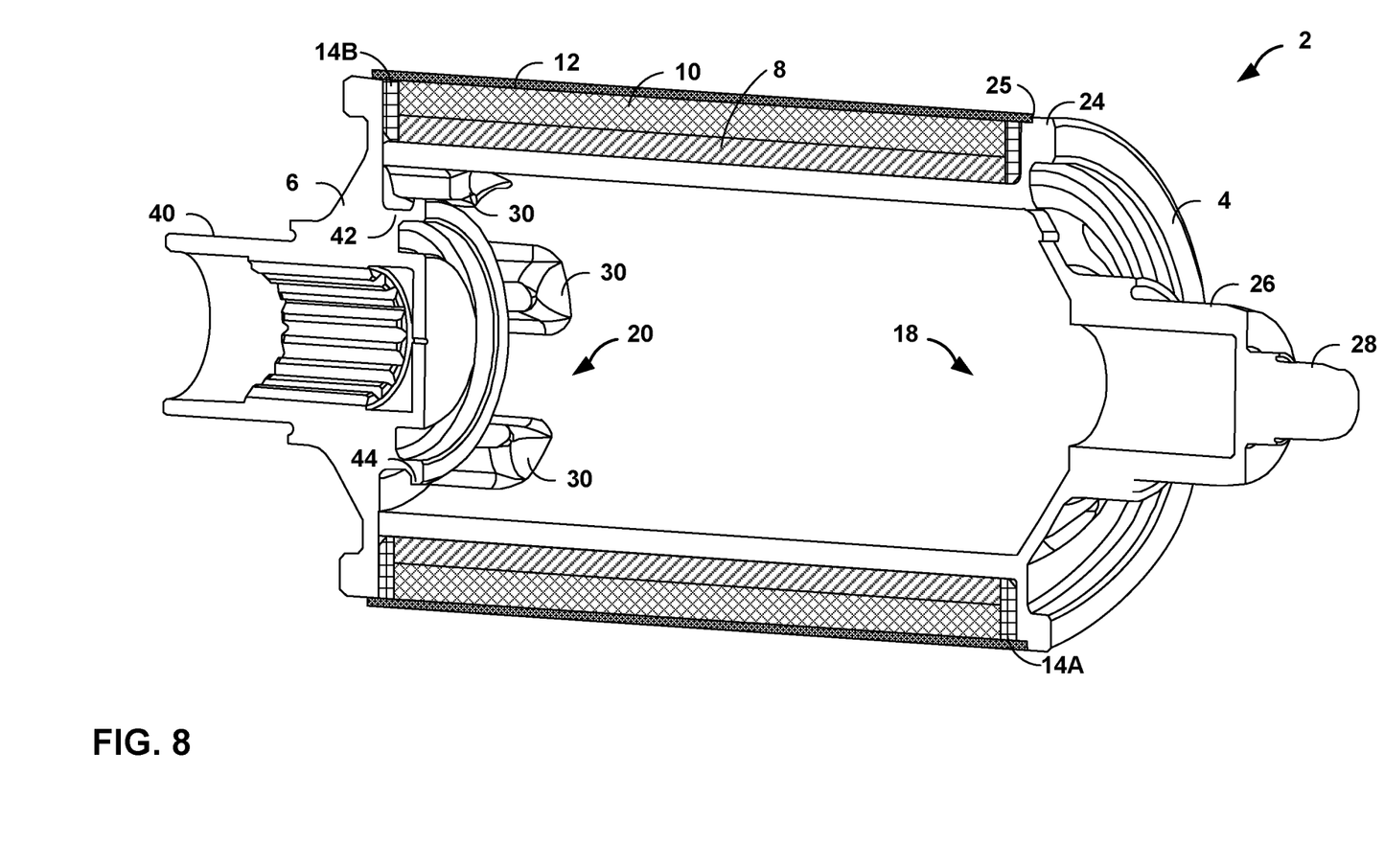
FIG. 8 is another cross-sectional view of rotor 2 of FIG. 1 configured in accordance with one or more aspects of this disclosure.

FIG. 8 is another cross-sectional view of rotor 2 of FIG. 1 configured in accordance with one or more aspects of this disclosure. As shown in the example of FIG. 8 and as discussed above, end flange 6 may be press-fit into main rotor body 4.

In some examples, second end 20 of cylinder body 16 may include a pilot configured to receive at least a portion of end flange 6. For instance, as shown in the examples of FIGS. 1 and 2, second end 20 of cylinder body 16 includes an inner diameter sized to receive an outer diameter of end flange 6 (e.g., $ID_{20}$ is sized to be equal to, or slightly smaller than, $OD_{44}$). In some examples, the pilot may be an interrupted pilot. For instance, as shown in the example of FIG. 8, the inner diameter of second end 20 may be defined by receptacles 30. By including an interrupted pilot, the stiffness of cylinder body 16 may be reduced, thereby reducing lamination stresses.

As discussed above, rotor 2 may include spacers 14, which may magnetically isolate the flux from the shaft (e.g., spacers 14 may act like air). By including spacers 14, main rotor body 4 may be formed of a material (e.g., magnetic steel) that provides desirable mechanical properties in terms of strength and wear resistance. Spacers 14 may be formed of stainless steel. As shown in the examples of FIG. 1 and FIG. 8, spacers 14 may include spacer 14A disposed between laminations 8/magnetic material 10 (collectively referred to as laminations) and the retention flange such that the laminations do not directly contact retention flange 24, and spacer 14B disposed between the laminations and end flange 6 such that the laminations do not directly contact end flange 6.

Figure 9:
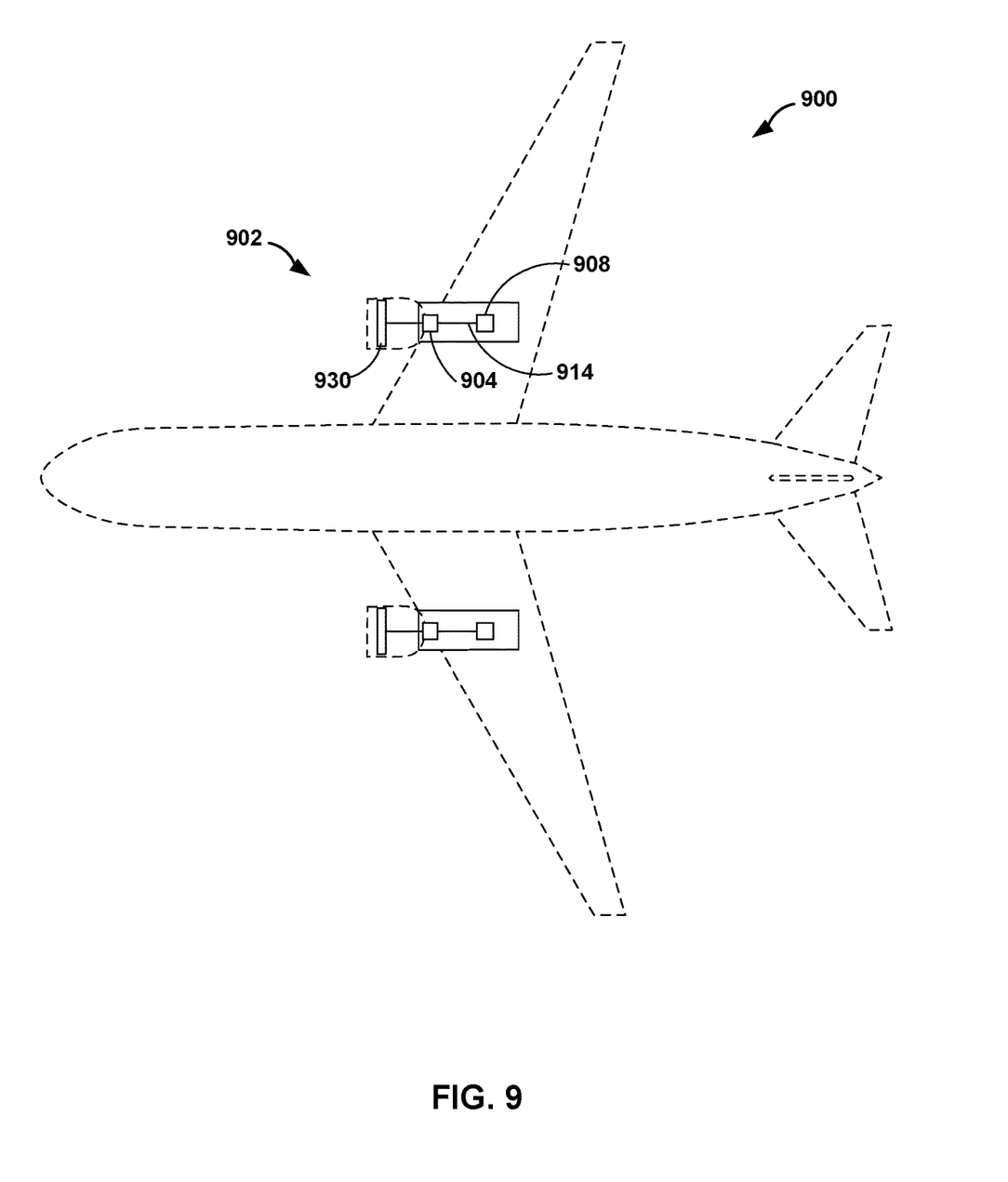
FIG. 9 is a conceptual diagram of a vehicle 900 that includes an electric machine, in accordance with one or more techniques of this disclosure.

FIG. 9 is a conceptual diagram of a vehicle 900 that includes an electric machine, in accordance with one or more techniques of this disclosure. In some examples, vehicle 900 includes an aircraft. In other examples, vehicle 900 may include any type of combustion engine-powered vehicle, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. Vehicle 900 may be manned, semiautonomous, or autonomous.

As shown in the example of FIG. 9, vehicle 900 may include propulsion system 902. In some examples, propulsion system 902 may include a combustion engine, such as a gas-turbine engine. Propulsion system 900 includes motor 904 that is configured to drive propulsor 930. Propulsion systems that include gas-turbine engines may include an electric starter/generator (ESG) that may both start the gas-turbine engines and generate electrical power using mechanical energy generated by the gas-turbine engines. As shown in FIG. 9, propulsion system 902 may include ESG 908 that is coupled to motor 904 via shaft 914.

In accordance with one or more techniques of this disclosure, ESG 908 may include a rotor as described in this disclosure. For instance, ESG 908 may include a rotor comprising a main rotor body having a longitudinal axis, the main rotor body comprising: a hollow cylinder body with a first end and a second end; an integral end flange at the first end; a separate end flange disposed at the second end of the cylinder body; and laminations disposed on an outer surface of the cylinder body, the laminations comprising magnetic material. As one example, the separate end flange may be end flange 6 described above. In such examples, end flange 6 may be connected to shaft 914 (or an intermediate shaft) via spline interface 34.

The following examples may illustrate one or more aspects of the disclosure:

Example 1. A rotor of an electric machine, the rotor comprising: a main rotor body having a longitudinal axis, the main rotor body comprising: a hollow cylinder body with a first end and a second end; an integral end flange at the first end; a separate end flange disposed at the second end of the cylinder body; and laminations disposed on an outer surface of the cylinder body, the laminations comprising magnetic material.

Example 2. The rotor of example 1, wherein an outer diameter of the separate end flange is greater than an outer diameter of the second end of the cylinder.

Example 3. The rotor of example 2, further comprising: a spacer disposed between the laminations and the separate end flange such that the laminations does not directly contact the separate end flange.

Example 4. The rotor of example 2, wherein the main rotor body further comprises a retention flange on the first end, wherein a diameter of the retention flange is greater than the diameter of the second end of the cylinder.

Example 5. The rotor of example 4, further comprising: a first spacer disposed between the laminations and the separate end flange such that the laminations do not directly contact the separate end flange; and a second spacer disposed between the laminations and the retention flange such that the laminations do not directly contact the retention flange.

Example 6. The rotor of any of examples 1-5, wherein the separate end flange is configured to be press-fit into the second end of the cylinder.

Example 7. The rotor of example 6, wherein at least a portion of the separate end flange extends longitudinally into the second end of the cylinder.

Example 8. The rotor of example 7, wherein the portion of the separate end flange that extends into the second end of the cylinder includes at least two longitudinally displaced segments having different outer diameters.

Example 9. The rotor of example 8, wherein, when press-fit into the second end of the cylinder, an outer surface of a first segment of the at least two segments does not contact the cylinder and an outer surface of a second segment of the at least two segments does contact the cylinder.

Example 10. The rotor of example 9, wherein the second segment extends further into the cylinder than the first segment.

Example 11. The rotor of any of examples 1-10, wherein at least a portion of the separate end flange extends longitudinally under at least a portion of the magnetic material.

Example 12. The rotor of any of examples 1-11, wherein the separate end flange is configured to be attached to the second end of the cylinder via a plurality of bolts.

Example 13. The rotor of example 12, wherein the second end of the cylinder includes a plurality of receptacles configured to receive the plurality of bolts, and wherein an inner diameter of the second end of the cylinder is defined by the plurality of receptacles.

Example 14. The rotor of any of examples 1-13, wherein the integral end flange comprises a plurality of radially disposed slots.

Example 15. The rotor of any of examples 1-14, wherein the separate end flange comprises a hollow shaft disposed along the longitudinal axis, and wherein the integral end flange comprises a hollow shaft disposed along the longitudinal axis having a same outer diameter as the hollow shaft of the separate end flange.

Example 16. The rotor of example 15, wherein the integral end flange further comprises a solid shaft disposed along the longitudinal axis, wherein the solid shaft of the integral end flange is located distal from the cylinder jacket relative to the hollow shaft of the integral end flange.

Example 17. The rotor of example 16, wherein an outer diameter of the solid shaft of the integral end flange is less than the outer diameter of the hollow shaft of the integral end flange.

Example 18. The rotor of claim 17, wherein the main rotor body is monolithic.

Example 19. The rotor of any of examples 1-18, further comprising a sleeve disposed radially over the laminations.

Example 20. An airframe comprising: a combustion engine; an electric starter generator comprising a rotor that includes: a main rotor body having a longitudinal axis, the main rotor body comprising: a hollow cylinder body with a first end and a second end; an integral end flange at the first end; a separate end flange disposed at the second end of the cylinder body; and laminations disposed on an outer surface of the cylinder body, the laminations comprising magnetic material; and a shaft connected to the separate end flange and the combustion engine.

Various examples have been described. These and other examples are within the scope of the following claims.

What is claimed is:

1. A rotor of an electric machine, the rotor comprising:
 a main rotor body having a longitudinal axis, the main rotor body comprising:
  a hollow cylinder body with a first end and a second end;
  an integral end flange at the first end;
 a separate end flange disposed at the second end of the cylinder body; and
 laminations disposed on an outer surface of the cylinder body, the laminations comprising magnetic material, wherein an outer diameter of the separate end flange is greater than an outer diameter of the second end of the cylinder, wherein the separate end flange is configured to be press-fit into the second end of the cylinder, and wherein at least a portion of the separate end flange extends longitudinally into the second end of the cylinder and under at least a portion of the magnetic material.

2. The rotor of claim 1, further comprising:
 a spacer disposed between the laminations and the separate end flange such that the laminations does not directly contact the separate end flange.

3. The rotor of claim 1, wherein the main rotor body further comprises a retention flange on the first end, wherein a diameter of the retention flange is greater than the diameter of the second end of the cylinder.

4. The rotor of claim 3, further comprising:
 a first spacer disposed between the laminations and the separate end flange such that the laminations do not directly contact the separate end flange; and
 a second spacer disposed between the laminations and the retention flange such that the laminations do not directly contact the retention flange.

5. The rotor of claim 1, wherein the portion of the separate end flange that extends into the second end of the cylinder includes at least two longitudinally displaced segments having different outer diameters.

6. The rotor of claim 5, wherein, when press-fit into the second end of the cylinder, an outer surface of a first segment of the at least two segments does not contact the cylinder and an outer surface of a second segment of the at least two segments does contact the cylinder.

7. The rotor of claim 6, wherein the second segment extends further into the cylinder than the first segment.

8. The rotor of claim 1, wherein the separate end flange is configured to be attached to the second end of the cylinder via a plurality of bolts.

9. The rotor of claim 8, wherein the second end of the cylinder includes a plurality of receptacles configured to receive the plurality of bolts, and wherein an inner diameter of the second end of the cylinder is defined by the plurality of receptacles.

10. The rotor of claim 1, wherein the integral end flange comprises a plurality of radially disposed slots.

11. The rotor of claim 1, wherein the separate end flange comprises a hollow shaft disposed along the longitudinal axis, and wherein the integral end flange comprises a hollow shaft disposed along the longitudinal axis having a same outer diameter as the hollow shaft of the separate end flange.

12. The rotor of claim 1, wherein the main rotor body is monolithic.

13. The rotor of claim 1, further comprising a sleeve disposed radially over the laminations.

14. An airframe comprising:
a combustion engine;
an electric starter generator comprising a rotor that includes
   a main rotor body having a longitudinal axis, the main rotor body comprising:
      a hollow cylinder body with a first end and a second end;
      an integral end flange at the first end;
      a separate end flange disposed at the second end of the cylinder body; and
   laminations disposed on an outer surface of the cylinder body, the laminations comprising magnetic material, wherein an outer diameter of the separate end flange is greater than an outer diameter of the second end of the cylinder, wherein the separate end flange is configured to be press-fit into the second end of the cylinder, and wherein at least a portion of the separate end flange extends longitudinally into the second end of the cylinder and under at least a portion of the magnetic material; and
a shaft connected to the separate end flange and the combustion engine.

15. The airframe of claim 14, further comprising:
a spacer disposed between the laminations and the separate end flange such that the laminations does not directly contact the separate end flange.

16. The airframe of claim 14, wherein the main rotor body further comprises a retention flange on the first end, wherein a diameter of the retention flange is greater than the diameter of the second end of the cylinder.

17. The airframe of claim 16, further comprising:
a first spacer disposed between the laminations and the separate end flange such that the laminations do not directly contact the separate end flange; and
a second spacer disposed between the laminations and the retention flange such that the laminations do not directly contact the retention flange.

18. The airframe of claim 14, wherein the portion of the separate end flange that extends into the second end of the cylinder includes at least two longitudinally displaced segments having different outer diameters.

19. The airframe of claim 18, wherein, when press-fit into the second end of the cylinder, an outer surface of a first segment of the at least two segments does not contact the cylinder and an outer surface of a second segment of the at least two segments does contact the cylinder.

20. The airframe of claim 14, wherein the separate end flange comprises a hollow shaft disposed along the longitudinal axis, and wherein the integral end flange comprises a hollow shaft disposed along the longitudinal axis having a same outer diameter as the hollow shaft of the separate end flange.

* * * * *